United States Patent
Yong

(10) Patent No.: US 8,824,431 B2
(45) Date of Patent: Sep. 2, 2014

(54) APPARATUS FOR ACQUIRING NETWORK INFORMATION

(75) Inventor: Liu Yong, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 1424 days.

(21) Appl. No.: 11/802,156

(22) Filed: May 21, 2007

(65) Prior Publication Data

US 2008/0112376 A1    May 15, 2008

Related U.S. Application Data

(60) Provisional application No. 60/858,336, filed on Nov. 13, 2006.

(30) Foreign Application Priority Data

Jan. 24, 2007 (KR) .................. 10-2007-0007440

(51) Int. Cl.
*H04W 4/00* (2009.01)
*H04W 48/20* (2009.01)
*H04W 88/04* (2009.01)
*H04W 88/06* (2009.01)

(52) U.S. Cl.
CPC .............. *H04W 48/20* (2013.01); *H04W 88/04* (2013.01); *Y02B 60/50* (2013.01); *H04W 88/06* (2013.01)
USPC ........ 370/338; 455/522; 455/552.1; 455/574; 455/127.5; 455/453

(58) Field of Classification Search
USPC ............................ 370/338, 389; 455/522, 552
See application file for complete search history.

(56) References Cited

U.S. PATENT DOCUMENTS

| 6,636,499 | B1* | 10/2003 | Dowling ................ 370/338 |
| 7,539,507 | B2* | 5/2009 | Grob et al. ............. 455/522 |
| 2002/0151325 | A1* | 10/2002 | Fitton et al. ............. 455/553 |
| 2003/0013474 | A1* | 1/2003 | Pham et al. ............. 455/522 |
| 2003/0124979 | A1* | 7/2003 | Tanada et al. ............. 455/41 |
| 2003/0126551 | A1* | 7/2003 | Mantha et al. ............. 714/790 |
| 2004/0088634 | A1* | 5/2004 | Kim et al. ............. 714/752 |
| 2006/0030265 | A1* | 2/2006 | Desai et al. ............. 455/41.2 |
| 2007/0110360 | A1* | 5/2007 | Stanford ............. 385/14 |
| 2007/0183374 | A1* | 8/2007 | Classon et al. ............. 370/338 |
| 2008/0080415 | A1* | 4/2008 | Stephenson et al. ............. 370/328 |

FOREIGN PATENT DOCUMENTS

JP    2006-217055      8/2006
KR    1020060010553 A1    2/2006

OTHER PUBLICATIONS

Lo et al., Hybrid-ARQ in Multihop Networks with opportunistic Relay Selection, pp. 1-4.*
John Jetzt, et al.; "LLDP / LLDP-MED Proposal for PoE Plus"; Sep. 15, 2006; pp. 1-15.
"Link Layer Discovery Protocol (LLDP): A New Standard for Discovering and Managing Converged Network Devices"; Tech Brief—LLDP; 2005 Extreme Networks, Inc.; pp. 1-5.

* cited by examiner

*Primary Examiner* — Khalid Shaheed
(74) *Attorney, Agent, or Firm* — NSIP Law

(57) ABSTRACT

A network information acquisition apparatus is provided for acquiring network information related to a wireless network. The apparatus being located in a wireless network coverage area, which can receive network information related to a wireless network, from a base station of a wireless network, an access point, and another terminal which has already received network information and is located a short distance away, thereby minimizing a power consumption amount required for receiving network information.

13 Claims, 9 Drawing Sheets

APPARATUS FOR ACQUIRING NETWORK INFORMATION

CROSS-REFERENCE TO RELATED APPLICATIONS

This application claims the benefit under 35 U.S.C. §119 (e) of a U.S. Provisional Application No. 60/858,336, filed on Nov. 13, 2006, in the U.S. Patent and Trademark Office, and under 35 U.S.C. §119(a) of a Korean Patent Application No. 10-2007-0007440, filed on Jan. 24, 2007, in the Korean Intellectual Property Office, the entire disclosure of both of which are hereby incorporated by reference.

BACKGROUND OF THE INVENTION

1. Field of the Invention

The present invention relates to an apparatus for acquiring network information related to a wireless network, the apparatus being located in a wireless network coverage area. More particularly, the present invention relates to an apparatus for acquiring network information from another terminal located a short distance away before acquiring network information by directly connecting with an access point located a long distance away, thereby reducing a power consumption amount required for acquiring network information.

2. Description of Related Art

Development of wireless networks enables various services such as telephone calls, data communication, image communication, video on demand (VOD), and the like to be used. However, a mobile terminal including a large display, a camera, and the like is required in order to use the service, and a power consumption amount of the terminal becomes an important problem due to the additional power consumption amount of the additional portions.

FIG. 1 is a diagram illustrating network information acquisition apparatuses 120 and 130, which acquire network information according to the conventional method. As illustrated in FIG. 1, when a mobile terminal requires a service list which a wireless network provides, or requires network information such as a common control variable used in a terminal located in a wireless network coverage area, and the like, the mobile terminal should unfailingly receive the service list or the control variable by connecting with a base station of a wireless network, or an access point 110.

However, since an averaged signal is transmitted to a base station of a wireless network or an access point, which is located at about half of a maximal distance at which a terminal may perform communication, unnecessary power is consumed.

Also, a Link Layer Discovery Protocol (LLDP), approved as a standard in Institute of Electrical and Electronics Engineers (IEEE) 802.1AB, is a simple protocol that periodically informs, to each device, a case where a device such as a new router, a terminal, and the like, is installed in a wireless network, and where a network type is changed, or a resource is changed.

FIG. 2 is a diagram illustrating a network type and a resource change state being exchanged between each element of a network using an LLDP according to the related art.

When each element 210, 220, 230, and 240 configuring a network is connected with the network, network type information such as a port number and the like, which corresponds with a device identifier of each element and the network using the LLDP, is exchanged between adjacent elements. Based on the information, each element may identify which element in another network is connected with each element, and how the information is exchanged with the element. Since the network type information is periodically transmitted to the adjacent element by element, each element may check for a network change by analyzing the type information transmitted from the adjacent element. According to an example in FIG. 2, an IP phone 210 and a switch 230 exchange network type information, e.g. "I'm a switch" and "I'm an IP-Phone", to each other, and the exchanged information may be stored in a management information storing unit corresponding to a management information base (MIB), and be constantly maintained.

FIG. 3 is a diagram illustrating a structure of an LLDP agent 300 for exchanging actual information between adjacent devices in a conventional LLDP according to the related art. As illustrated in FIG. 3, the LLDP agent 300 includes a device information storing unit 310 corresponding to an LLDP local system MIB, a remote device information storing unit 320 corresponding to an LLDP remote systems MIB, an extended device information storing unit 330 corresponding to an organizationally defined local device LLDP MIB extension, and an extended remote device information storing unit 340 corresponding to an organizationally defined remote device LLDP MIB extensions. Hereinafter, referring to FIG. 3, a function for each element is described in detail.

A port number connected with a device identifier of a corresponding network element, a description with respect to each port, management information, and the like, are stored in the device information storing unit 310. Also, a device identifier with respect to another device connected with the network configuration device, a connected port number, a description with respect to each port, management information, and the like, are stored in the remote device information storing unit 320.

The extended device information storing unit 330 stores physical layer connection information of the corresponding network element, and the like, and the extended remote device information storing unit 340 stores physical layer connection information with respect to another device connected with the network configuration device, and the like.

The LLDP agent 300 manages information stored in the storing units being controlled by a service discovery module existing in a upper layer of a protocol stack, and reports the information to the service discovery module transmitting the information to an external apparatus, or updating the information transmitted by the external apparatus.

However, the above-described LLDP agent 300 merely transmits a device identifier of a corresponding device and a resource change state to an adjacent device. The LLDP agent may not transmit information of the corresponding device to a long-distance device via the adjacent device, and may not be used for service list transmission in a mobile communication environment.

Accordingly, there is a need for a network information acquisition apparatus which can extend the functionality of an LLDP for exchanging system information in a link layer of a conventional wireless network apparatus. The network acquisition apparatus receives network information from a terminal, which is located a short distance away from the network information acquisition apparatus and has already received network information, excluding a base station of mobile communication or an access point located a long distance away from the network information acquisition apparatus, thereby minimizing a power consumption amount during the network information acquisition process.

SUMMARY OF THE INVENTION

Exemplary embodiments of the present invention address at least the above problems and/or disadvantages and provide at least the advantages described below. Accordingly, an aspect of exemplary embodiments of the present invention is to provide a network information acquisition apparatus, the apparatus being located in a wireless network coverage area, which can easily acquire network information related to a wireless network using low power communication between terminals.

An aspect of exemplary embodiments of the present invention also provides a network information provision apparatus, the apparatus being located in a wireless network coverage area, which acquires network information related to a wireless network. The acquired network information is stored in the network information provision apparatus and forwarded to another terminal.

According to an aspect of exemplary embodiments of the present invention, there is provided a network information acquisition apparatus for acquiring network information related to a wireless network, the apparatus being located in a wireless network coverage area, wherein the apparatus includes a high power communication unit for transmitting a first network information request to an access point of a wireless network, a low power communication unit for transmitting a second network information request to at least one terminal located in a wireless network coverage area, and a communication control unit for controlling an operation of the high power communication unit and the low power communication unit, and the communication control unit controls the low power communication unit to transmit the second network information request when the communication control unit does not receive network information in response to the first network information request from the high power communication unit.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A network information acquisition apparatus or a network information provision apparatus according to exemplary embodiments of the present invention may include any one of a wireless communication terminal and a communication module, which is installed and operated in the wireless communication terminal.

Hereinafter, a network information acquisition apparatus and a network information provision apparatus according to exemplary embodiments of the present invention will be described in detail with reference to the accompanying drawings.

Figure 1:
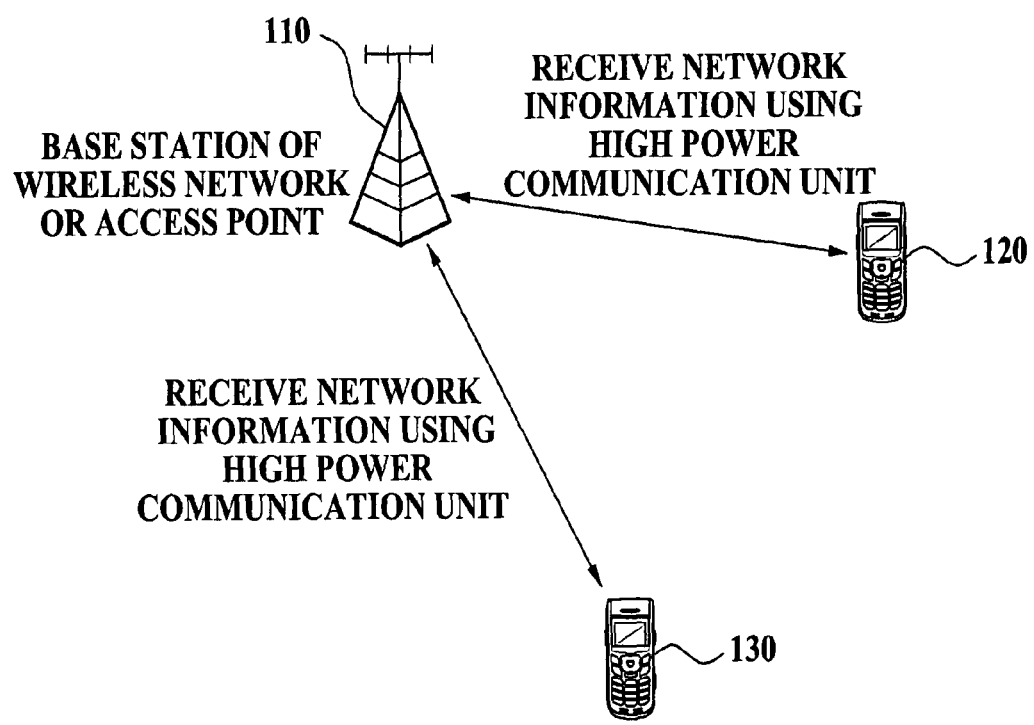
FIG. 1 is a diagram illustrating network information being directly acquired from an access point using a high power communication method according to the related art.
Figure 2:
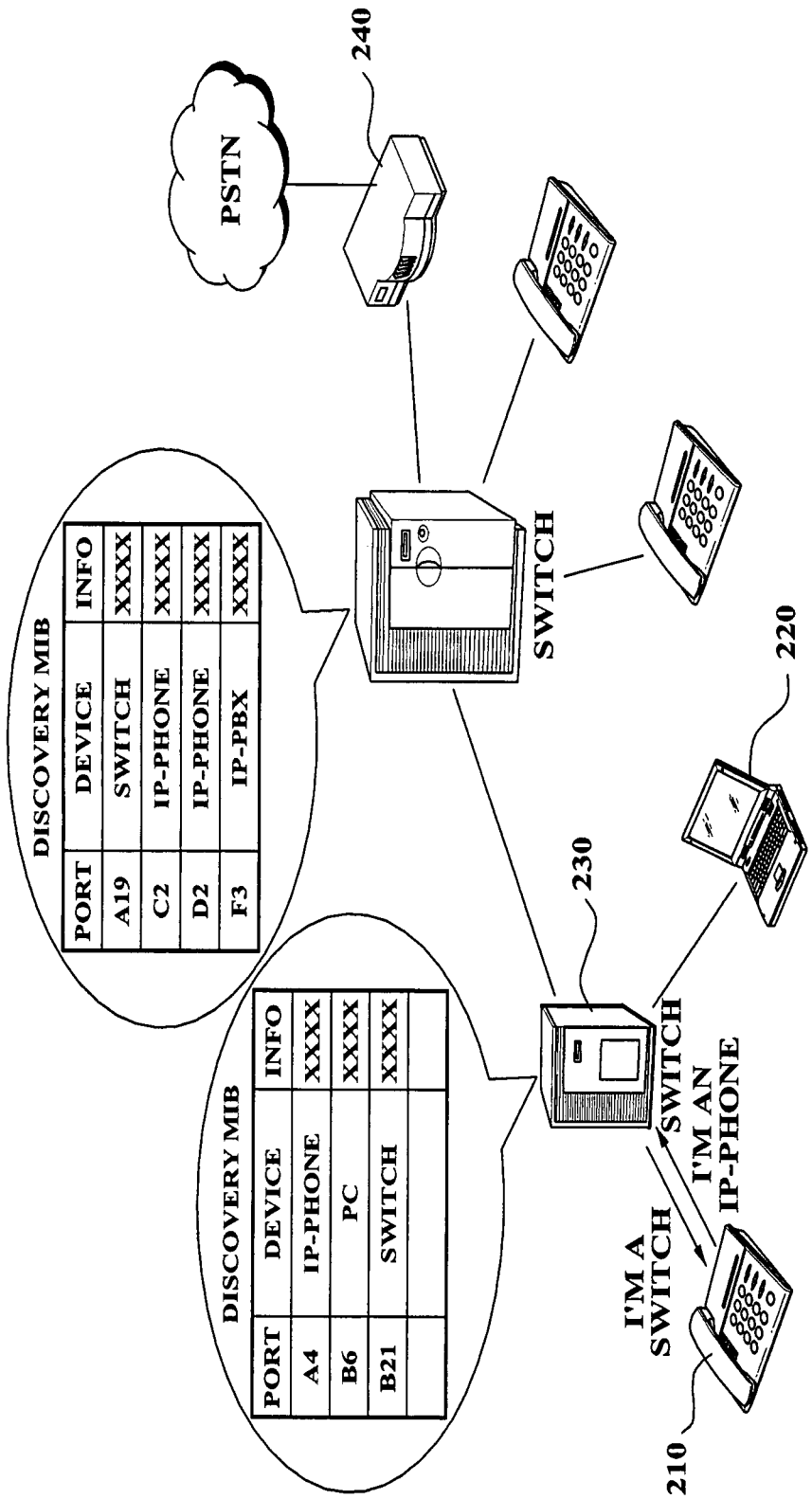
FIG. 2 is a diagram illustrating information such as each identifier, an apparatus type, and the like, being exchanged between each element of a network using a Link Layer Discovery Protocol (LLDP) according to the related art.
Figure 3:
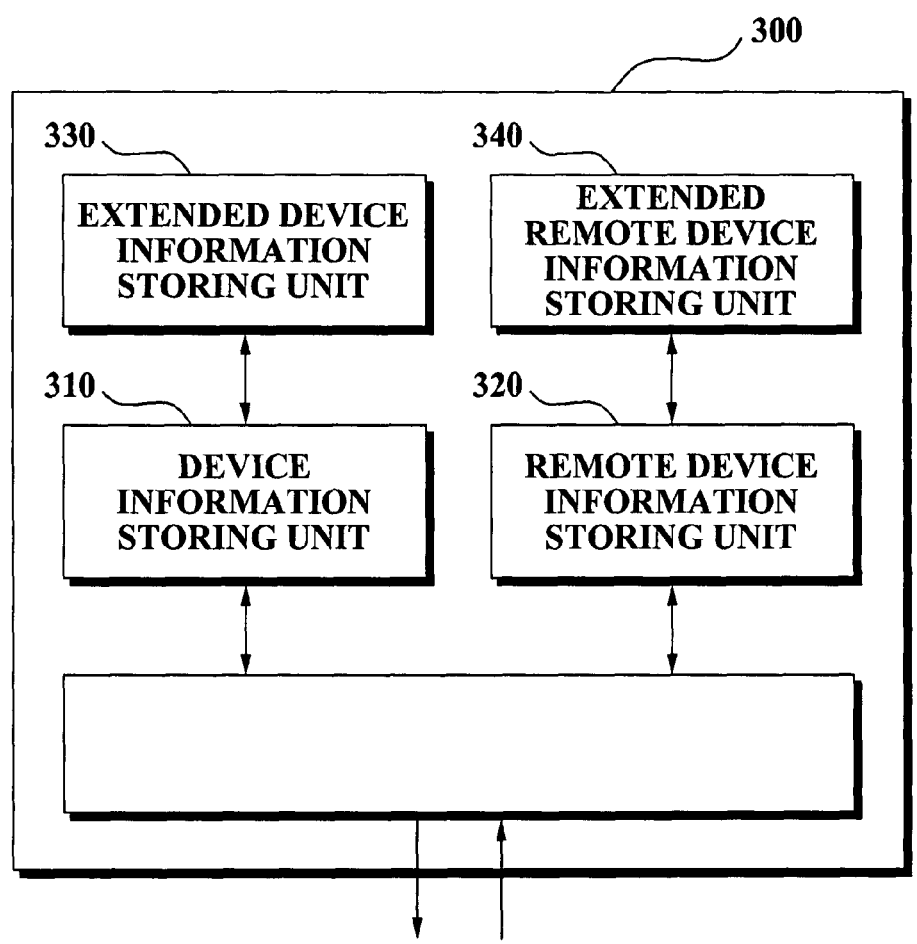
FIG. 3 is a diagram illustrating a structure of an LLDP agent according to the related art.
Figure 4:
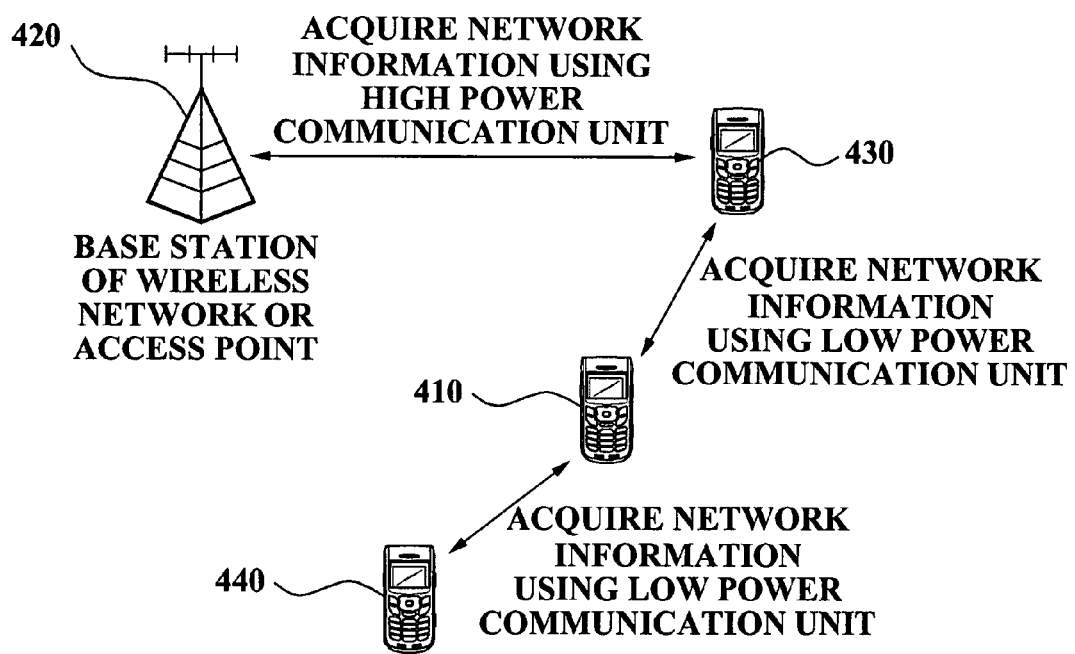
FIG. 4 is a diagram illustrating network information being acquired using a low power communication method between terminals according to an exemplary embodiment of the present invention.

FIG. 4 is a diagram illustrating a process in which a network information acquisition apparatus 410 according to an exemplary embodiment of the present invention acquires network information about interoperations of a base station, an access point, and a network information provision apparatus.

When the network information acquisition apparatus 410 intends to use a service which a network provides, or requires a common control variable in a wireless network coverage area, and the like, the network information acquisition apparatus 410 receives network information from another surrounding network information provision apparatus 430 which has already acquired network information, before the network information acquisition apparatus 410 receives network information by connecting directly with a base station of a wireless network or an access point 420 located in a long distance away from the network information acquisition apparatus 410.

Since the distance between a base station of a wireless network or an access point 420 and a terminal is generally greater than the distance between terminals in a wireless network coverage, the power consumption amount by which a network information acquisition apparatus may receive network information from the network information provision apparatus, which has already received network information, is less than the power consumption amount where the network information acquisition apparatus receives network information by connecting with the base station of the wireless network.

The network information acquisition apparatus 410 which acquires network information, as described above, may be operated as a network information provision apparatus for another network information acquisition apparatus 440 which has not acquired network information yet.

Figure 5:
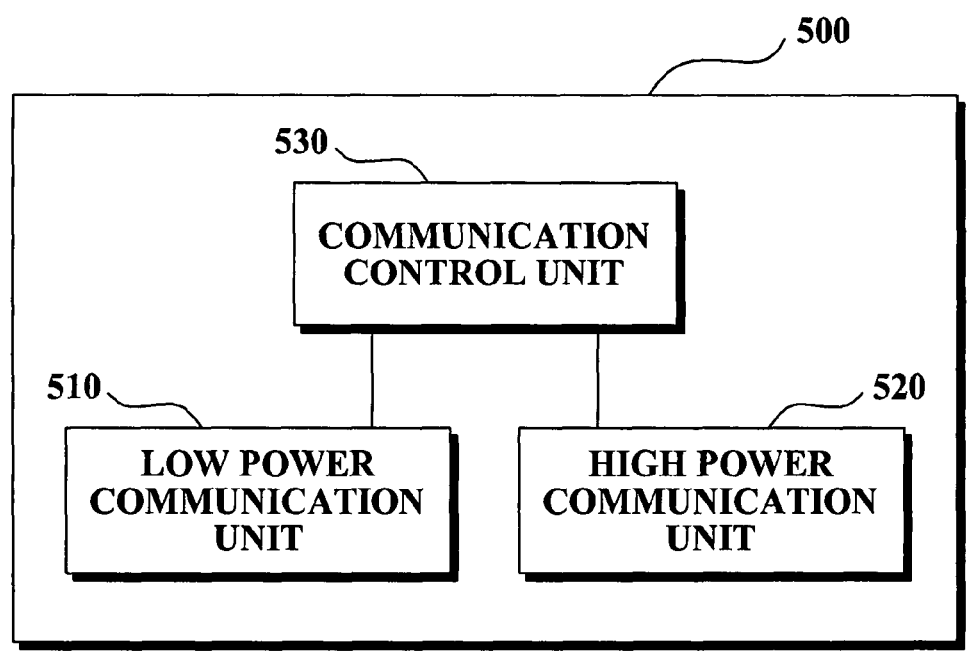
FIG. 5 is a diagram illustrating a structure of a network information acquisition apparatus according to an exemplary embodiment of the present invention.

FIG. 5 is a block diagram illustrating an internal structure of a network information acquisition apparatus according to an exemplary embodiment of the present invention. As illustrated in FIG. 5, a network information acquisition apparatus 500 includes a low power communication unit 510, a high power communication unit 520, and a communication control unit 530. Hereinafter, referring to FIG. 5, a function for each element is described in detail.

The communication control unit 530 in the network information acquisition apparatus 500, which has not acquired network information yet, may passively receive network information in order to receive network information using a minimal amount of power. When network information is passively received, the high power communication unit 520 is first inactivated, and the low power communication unit 510 is activated. Therefore, a network information transmission signal is received from a surrounding network information provision apparatus. When the network information transmission signal is not received using the low power communication unit 510, the communication control unit 530 deactivates the low power communication unit 510, and activates the high power communication unit 520. Therefore, network information is directly transmitted from a base station of a wireless network, or an access point is acquired. The communication control unit 530 tries to acquire network information by activating the high power communication unit 520 when the low power communication unit 510 does not receive network information for a predetermined period of time.

The network information acquisition apparatus 500 may acquire network information by passively receiving the network information transmission signal, and may actively request network information transmission. When network information is actively received, the communication control unit 530 first activates the high power communication unit 520, and deactivates the low power communication unit 510. Therefore, a network information request is transmitted to an access point. The access point transmits network information to the network information acquisition apparatus 500 in response to the network information request. When communication with the access point is not performed using the high power communication unit 520, the communication control unit 530 deactivates the high power communication unit 520, and activates the low power communication unit 510. Therefore, the network information request is transmitted to another terminal corresponding to a network information provision apparatus located a short distance away from the network information acquisition apparatus 500.

The communication control unit 530 may determine that network information is not received and use the high power communication unit 520 when the high power communication unit 520 does not receive network information during a predetermined period of time. When network information is actively received, the high power communication unit 520 having a higher power consumption amount is first used, since communication with the access point using the high power communication unit 520 has a high probability of success. The high probability of success results from the fact that a network information acquisition apparatus generally exists in the wireless network coverage area, although a network information provision apparatus may not exist at a short distance from the network information acquisition apparatus. Generally, network information may be successfully received from the access point using the high power communication unit 520. Although a network information acquisition apparatus in a dead zone does not receive network information from the access point using the high power communication unit 520, network information may be received using the low power communication unit 510 from a network information provision apparatus located a short distance from the network information acquisition apparatus.

When a network information acquisition apparatus receives a plurality of pieces of network information from a plurality of network information provision apparatuses, any one piece of network information is selected considering the remaining time of the network information, which is included in each piece of network information. When network information is initially transmitted from a base station of mobile communication, or an access point to a network information acquisition apparatus, the remaining time of the network information is determined, and is updated considering a point of time of receiving network information, and a period of time of transmitting network information each time network information is transmitted via a network information acquisition apparatus or a network information provision apparatus. A network information acquisition apparatus may select network information having the longest remaining time of the network information from among the received plurality of pieces of network information in order to receive the latest network information.

When the network information acquisition apparatus receiving network information may be operated as a network information provision apparatus due to a network information request from another network information acquisition apparatus, another network information acquisition apparatus located in the dead zone may easily acquire network information when the network information acquisition apparatus receiving network information out of the dead zone is located a short distance away from the network information acquisition apparatus.

Network information which the network information acquisition apparatus acquires may include a network identifier for identifying a network, a service list which the network may provide, a common control variable for all terminals in the network, and the like.

Figure 6:
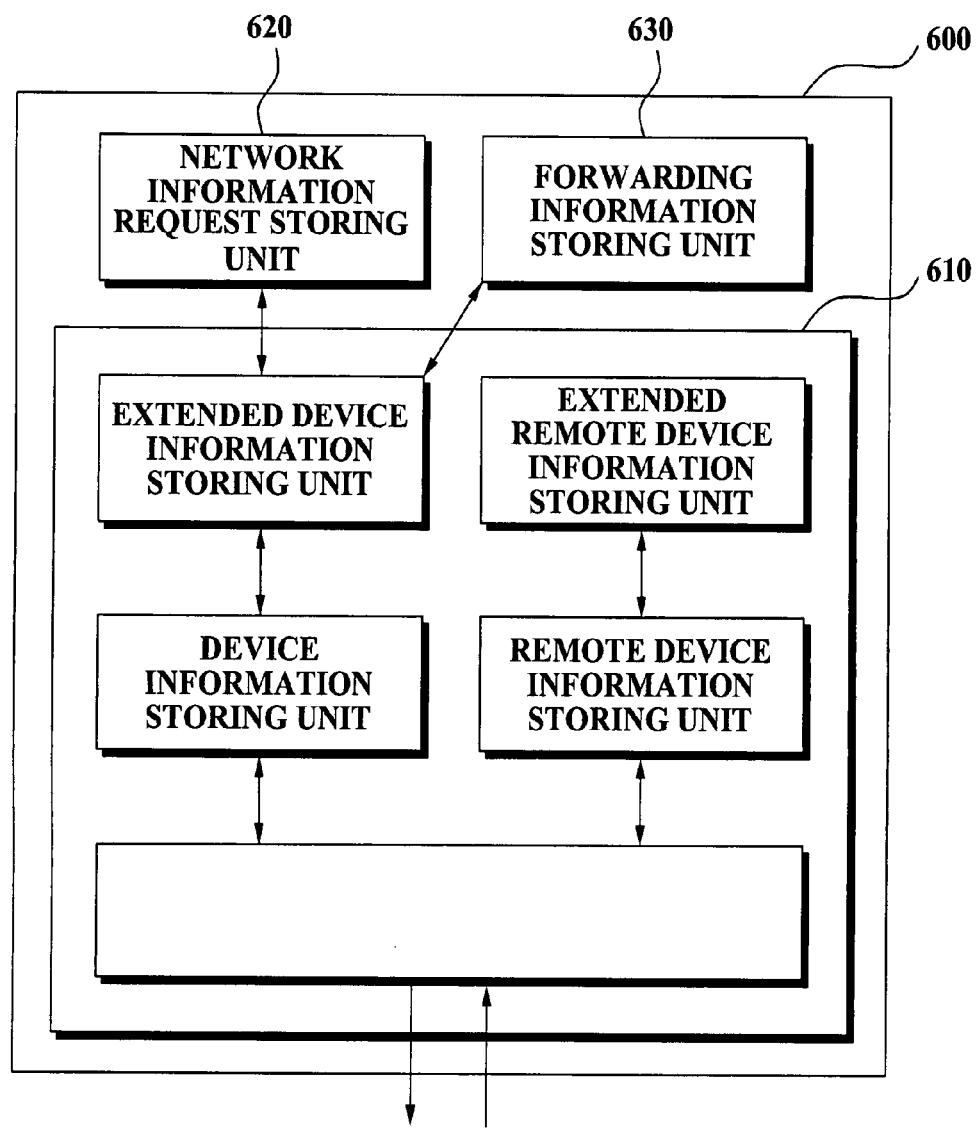
FIG. 6 is a diagram illustrating a structure of a new agent improving an LLDP agent used as a low power communication unit in a network information acquisition apparatus according to an exemplary embodiment of the present invention.

FIG. 6 is a diagram illustrating a low power communication unit 600 in a network information acquisition apparatus which is embodied modifying a conventional Link Layer Discovery Protocol (LLDP) agent according to an exemplary embodiment of the present invention. As illustrated in FIG. 6, a network information request storing unit 620 corresponding to an information request management information base (MIB) and a forwarding information storing unit 630 corresponding to an information relay MIB are added to a conventional LLDP agent structure 610, in the low power communication unit 600. Hereinafter, referring to FIG. 6, a function for each element is described in detail.

When a communication control unit in a network information acquisition apparatus determines to actively request network information to a network information provision apparatus, the communication control unit activates the network information request storing unit 620, creates a message requesting network information, and stores the message in the network information request storing unit 620. The LLDP agent used as the low power communication unit 600 transmits, to a network information provision apparatus, a network information request stored in the network information request storing unit 620 using a short-distance communication method having a low power consumption amount.

When network information is successfully acquired using a low power communication unit, or network information acquisition is abandoned using the low power communication unit, the communication control unit in the network information acquisition apparatus deletes the network information request stored in the network information request storing unit 620, and deactivates the low power communication unit.

When the network information acquisition apparatus receives network information via the low power communication unit or the high power communication unit, and is operated as the network information provision apparatus by the network information request which another network information acquisition apparatus transmits, the communication control unit in the network information provision apparatus activates a forwarding information storing unit 630, and network information in the forwarding information storing unit 630. The LLDP agent used as the low power communication unit transmits, to the network information acquisition apparatus, network information stored in the forwarding information storing unit 630 using a short-distance communication method having a low power consumption amount.

Figure 7:
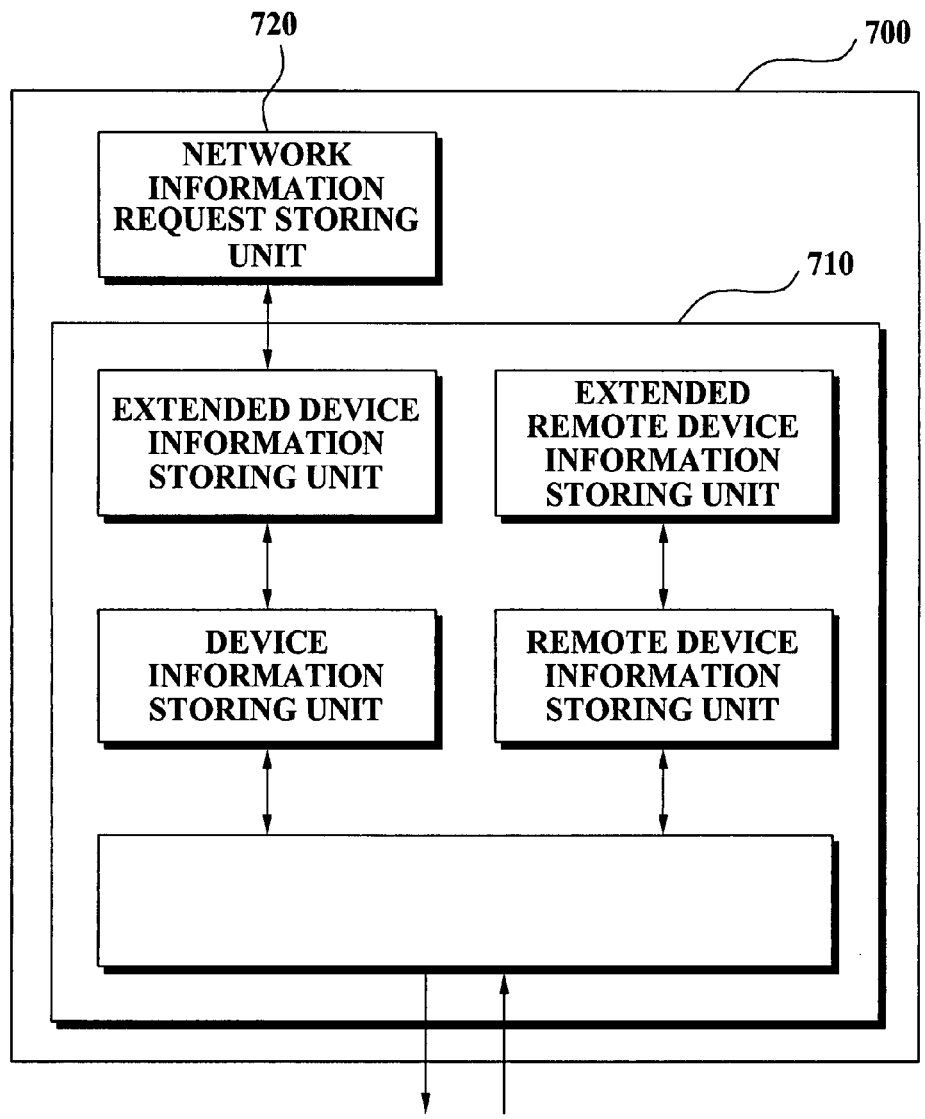
FIG. 7 is a diagram illustrating a structure of a new agent improving an LLDP agent used as a high power communication unit in a network information acquisition apparatus according to an exemplary embodiment of the present invention.

FIG. 7 is a diagram illustrating a high power communication unit 700 in a network information acquisition apparatus which is embodied modifying a conventional LLDP agent according to an exemplary embodiment of the present invention. As illustrated in FIG. 7, a network information request storing unit 720 corresponding to an information request MIB is added to a conventional LLDP agent structure 710, in the high power communication unit 700. Hereinafter, referring to FIG. 7, a function for each element is described in detail.

When a communication control unit in a network information acquisition apparatus determines to actively request network information to a network information provision apparatus using the high power communication unit 700, the communication control unit activates the network information request storing unit 720, makes a message requesting network information, and stores the message in the network information request storing unit 720. The LLDP agent used as the high power communication unit 700 transmits, to a base station of a wireless network or an access point, a network information request stored in the network information request storing unit 720 using a communication method having a high power consumption amount.

When network information is successfully acquired using the high power communication unit, or network information acquisition is abandoned using the high power communication unit, the communication control unit in the network information acquisition apparatus deletes the network information request stored in the network information request storing unit 720, and deactivates the high power communication unit.

Figure 8:
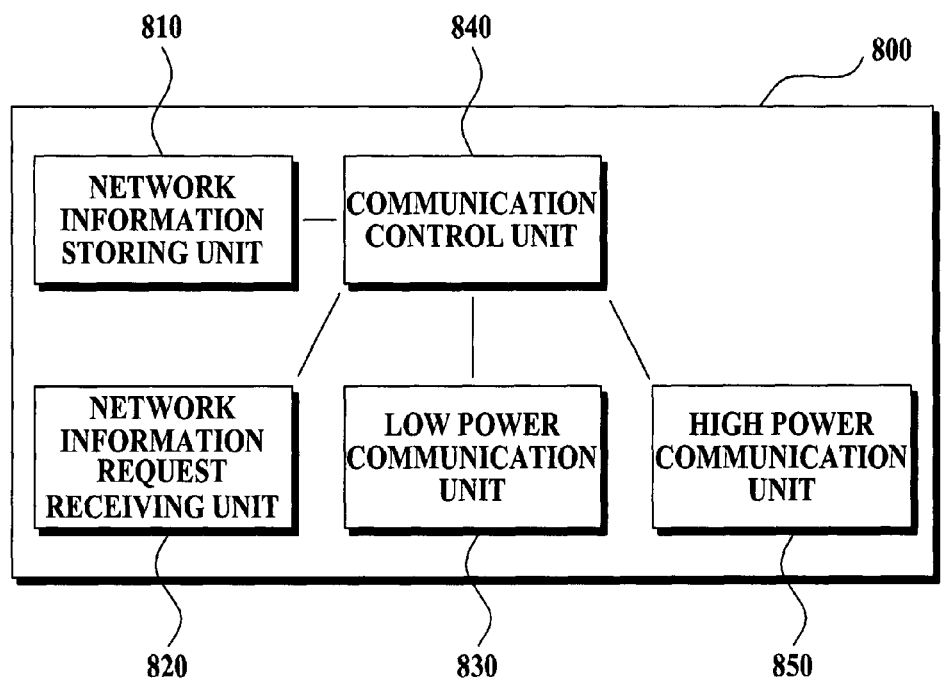
FIG. 8 is a diagram illustrating a structure of a network information provision apparatus according to an exemplary embodiment of the present invention.

FIG. 8 is a block diagram illustrating an internal structure of a network information provision apparatus according to an exemplary embodiment of the present invention. As illustrated in FIG. 8, a network information provision apparatus 800 includes a network information storing unit 810, a network information request receiving unit 820, a low power communication unit 830, a communication control unit 840, and a high power communication unit 850. Hereinafter, referring to FIG. 8, a function for each element is described in detail.

When the network information provision apparatus 800 receives network information via the low power communication unit 830 and the high power communication unit 850, the communication control unit 840 stores the received network information in the network information storing unit 810.

When the network information provision apparatus 800 receives a network information request from a network information acquisition apparatus via the network information request receiving unit 820, the communication control unit 840 determines whether to provide network information in response to the network information request.

When it is determined that network information is to be provided, the communication control unit 840 activates the low power communication unit 830, and transmits network information via the low power communication unit 830 for the network information acquisition apparatus located a short distance away.

When a network information provision apparatus does not have network information which the network information acquisition apparatus desires, the communication control unit 840 forwards the network information request via the low power communication unit 830 to another network information provision apparatus.

The network information provision apparatus, which receives network information via the low power communication unit 830 from the other network information provision apparatus, transmits the received network information via the low power communication unit 830 to the network information acquisition apparatus again.

When the identical network information acquisition apparatus repeatedly transmits the network information request, the communication control unit 840 may increase a transmission bandwidth of network information, and thereby reduce a period of time required for transmitting network information.

When the network information provision apparatus receives network information transmitted from the other network information provision apparatus via the low power communication unit 830, and checks that the received network information corresponds to network information which the network information provision apparatus is transmitting, the communication control unit 840 may reduce a transmission bandwidth of network information which the network information provision apparatus is transmitting, and thereby transmit network information more slowly.

A base station of a wireless network, or an access point, which initially transmits network information, may transmit network information including the remaining time of the transmitted network information. The network information provision apparatus, which receives network information, updates the remaining time of the network information considering a point in time of receiving network information from the base station, the access point, or the other network information provision apparatus, and a period of time required for transmitting network information by a request from the network information acquisition apparatus, and may transmit network information as valid information to the network information acquisition apparatus exclusively when the updated remaining time of the network information is greater than 0. When the updated remaining time of the network information is less than or equal to than 0, the communication control unit 840 may delete network information from the network information storing unit, and enable network information not to transmit to the network information acquisition apparatus.

Network information which the network information provision apparatus provides may include a network identifier for identifying a network, a service list which the network may provide, a common control variable of all terminals in the network, and the like.

Figure 9:
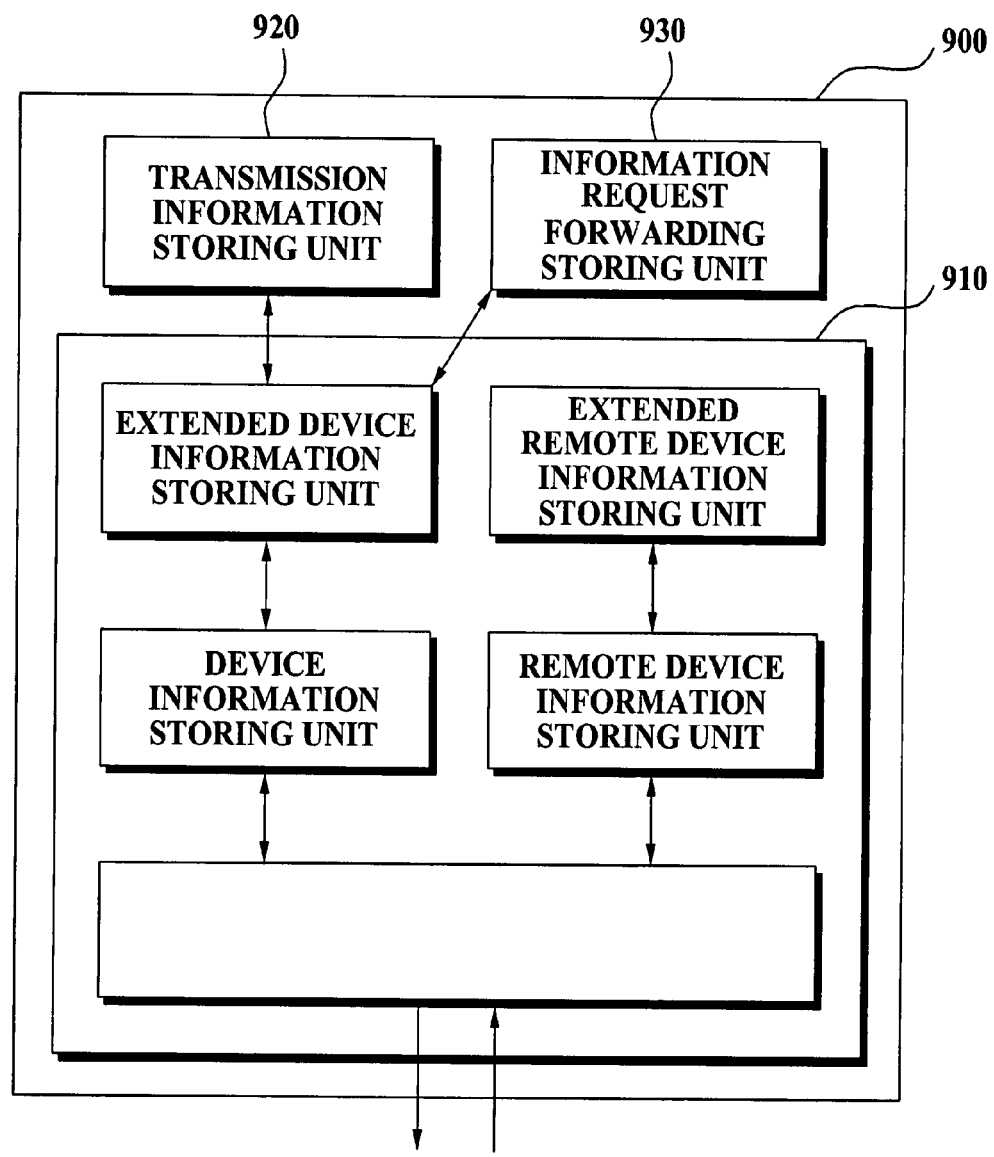
FIG. 9 is a diagram illustrating a structure of a new agent improving an LLDP agent used as a low power communication unit in a network information provision apparatus according to an exemplary embodiment of the present invention.

FIG. 9 is a diagram illustrating a low power communication unit 900 in a network information provision apparatus which is embodied modifying a conventional LLDP agent according to an exemplary embodiment of the present invention. As illustrated in FIG. 9, a transmission information storing unit 920 corresponding to an information diffusion MIB, and an information request forwarding storing unit 930 corresponding to an information proxy MIB are added to a conventional LLDP agent structure 910, in the low power communication unit 900. Hereinafter, referring to FIG. 9, a function for each element is described in detail.

When a communication control unit in the network information provision apparatus determines whether to provide network information in response to the network information request of the network information acquisition apparatus, the communication control unit activates the transmission information storing unit 920, and stores network information in the transmission information storing unit 920. The LLDP agent used as the low power communication unit 900 transmits, to the network information acquisition apparatus, network information stored in the transmission information storing unit 920 using a low power communication method. The LLDP agent used as the low power communication unit 900 updates the remaining time of the network information, which is included in network information, considering the time of receiving network information, and the time of transmitting network information to the network information acquisition apparatus. When the remaining time of the network information is less than or equal to 0, the communication control unit may delete network information stored in the transmission information storing unit 920, and activate the low power communication unit 900.

When the network information request, which the network information provision apparatus receives, includes a request with respect to information excluded from the network information provision apparatus, the network information request may be forwarded to a second network information provision apparatus. In an exemplary embodiment of the present invention, the communication control unit in the network information provision apparatus activates the information request forwarding storing unit 930 in the LLDP agent used as the low power communication unit 900, and stores the network information request in the information request forwarding storing unit 930. The LLDP agent transmits the network information request of the network information acquisition apparatus, which is stored in the information request forwarding storing unit 930, to the second network information acquisition apparatus.

According to exemplary embodiments of the present invention, there is provided a network information acquisition apparatus for acquiring network information related to a wireless network. The apparatus being located in a wireless network coverage area, which can acquire network information from another terminal located a short distance away, before acquiring network information directly connecting with an access point located in a long distance, thereby reducing a power consumption amount.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A network information acquisition apparatus that acquires network information related to a wireless network, the apparatus being located in a wireless network coverage area, and the apparatus comprising:
    a high power communication unit configured to transmit a first request for the network information to an access point of the wireless network;
    a low power communication unit configured to transmit a second request for the network information to a terminal located in the wireless network coverage area; and
    a communication control unit configured to
        activate the high power communication unit to transmit the first request to the access point, and deactivate the low power communication unit, and
        activate the low power communication unit to transmit the second request to the terminal, and deactivate the high power communication unit, when the high power communication unit does not receive the network information from the access point in response to the first request transmitted from the high power communication unit to the access point,
    wherein the received network information comprises a remaining time of the received network information, and
    wherein the communication control unit if further configured to update the remaining time of the received network information.

2. A network information acquisition apparatus that acquires network information related to a wireless network, the apparatus being located in a wireless network coverage area, and the apparatus comprising:
    a low power communication unit configured to receive the network information from a terminal located in the wireless network coverage area;
    a high power communication unit configured to receive the network information from an access point of the wireless network; and
    a communication control unit configured to
        activate the low power communication unit to receive the network information from the terminal, and deactivate the high power communication unit, and
        activate the high power communication unit to receive the network information from the access point, and deactivate the low power communication unit, when the low power communication unit does not receive the network information from the terminal,
    wherein the received network information comprises a remaining time of the received network information, and
    wherein the communication control unit is further configured to update the remaining time of the received network information.

3. The apparatus of any one of claims 1 and 2, wherein the low power communication unit is further configured to:
    forward the received network information to another terminal located in the wireless network coverage.

4. The apparatus of any one of claims 1 and 2, wherein the low power communication unit is further configured to:
    receive a forwarding request for the network information from another terminal located in the wireless network coverage, and not respond to the received forwarding request.

5. The apparatus of claim 2, wherein the communication control unit is further configured to:
    activate the high power communication unit to receive the network information from the access point, and deactivate the low power communication unit, when the low power communication unit does not receive the network information from the terminal during a predetermined period of time.

6. The apparatus of any one of claims 1 and 2, wherein:
the low power communication unit or the high power communication unit is further configured to receive pieces of network information, each of the pieces of network information comprising a remaining time; and
the communication control unit is further configured to select any piece of network information from among the pieces of network information based on the remaining time of each of the pieces of network information.

7. The apparatus of claim 6, wherein the low power communication unit is further configured to:
select a piece of network information that comprises the longest remaining time from among the pieces of network information.

8. The apparatus of any one of claims 1 and 2, wherein the received network information comprises network service list information and/or a network identifier.

9. A network information provision apparatus that provides network information related to a wireless network, the apparatus being located in a wireless network coverage area, and the apparatus comprising:
a network information storing unit configured to store and maintain the network information;
a network information request receiving unit configured to receive a request for the network information from a terminal located in the wireless network coverage area;
a low power communication unit configured to transmit the network information to the terminal; and
a communication control unit configured to activate the low power communication unit to transmit the network information to the terminal in response to the request,
wherein the low power communication unit is further configured to receive other network information from another terminal located in the wireless network coverage area,
wherein the communication control unit is further configured to control the low power communication unit to decrease a transmission bandwidth of the network information when the other network information correspond to the network information,
wherein the network information comprises a remaining time of the network information, and
wherein the communication control unit if further configured to control the low power communication unit to update and transmit the remaining time of the network information.

10. The apparatus of claim 9, wherein:
the network information comprises a remaining time of the network information; and
the communication control unit is further configured to control the low power communication unit to transmit the network information to the terminal exclusively when the remaining time of the network information is greater than 0.

11. The apparatus of claim 9, wherein the network information comprises network service list information and/or a network identifier.

12. The apparatus of claim 9, wherein:
the network information comprises a remaining time of the network information; and
the communication control unit is further configured to delete the network information from the network information storing unit when the remaining time of the network information is less than or equal to 0.

13. The apparatus of claim 9, wherein the communication control unit is further configured to:
control the low power communication unit to increase the transmission bandwidth of the network information when the network information request receiving unit repeatedly receives the request from the terminal.

* * * * *